United States Patent [19]

McAndrews

[11] Patent Number: 5,184,459
[45] Date of Patent: Feb. 9, 1993

US005184459A

[54] VARIABLE VANE VALVE IN A GAS TURBINE

[75] Inventor: Glenn McAndrews, Lebanon, Ohio

[73] Assignee: The United States of America as represented by the Secretary of the Air Force, Washington, D.C.

[21] Appl. No.: 809,568

[22] Filed: Dec. 17, 1991

Related U.S. Application Data

[63] Continuation of Ser. No. 531,665, May 29, 1990, abandoned.

[51] Int. Cl.⁵ .............................................. F02K 3/02
[52] U.S. Cl. .................................... 60/226.3; 60/262; 415/149.2
[58] Field of Search .................... 60/226.1, 226.3, 262; 415/115, 149.1, 149.2

[56] References Cited

U.S. PATENT DOCUMENTS

| 4,601,638 | 7/1986 | Hill et al. ............................. | 415/115 |
| 4,817,378 | 4/1989 | Giffin, III et al. ..................... | 60/262 |

FOREIGN PATENT DOCUMENTS 1426422  2/1969  Fed. Rep. of Germany ..... 60/226.3

*Primary Examiner*—Michael Koczo
*Assistant Examiner*—Michael I. Korharov
*Attorney, Agent, or Firm*—Thomas C. Stover; Donald J. Singer

[57] ABSTRACT

In a gas turbine bypass engine having an inlet for gas flow to a core duct and an outer duct for bypassing a portion of the inlet air flow around such core duct, an improvement is provided in which a plurality of pivotal outlet guide vanes mounted on the rear frame member, aft of the low-pressure turbine, the vanes being hollow and upstanding edgewise in the path of the core gas with each vane mounted to pivot on an axis extending through the length thereof, with means to pivot the vanes on their axes so as to correct the swirl of turbine discharge gases toward axial flow through the nozzle of such engine, during high bypass ratio and low bypass ratio operation. The vanes are sized to extend from the rear frame into close clearance with a wall defining the inner surface of the engine bypass duct, which wall has a plurality of apertures therethrough between bypass duct and core duct to define an interduct connecting area, which apertures are sized, shaped and located to match the cross-sectional area of such vanes, so that such apertures can be at least partially blocked by such vanes when the latter are pivoted therebeneath into registration therewith.

16 Claims, 4 Drawing Sheets

VARIABLE VANE VALVE IN A GAS TURBINE

STATEMENT OF GOVERNMENT INTEREST

The invention described herein may be manufactured and used by or for the Government for governmental purposes without the payment of any royalty thereon.

This application is a continuation of application Ser. No. 07/531,665, filed May 29, 1990, abandoned.

BACKGROUND OF THE INVENTION

1. Field of the Invention

This invention relates to bypass gas turbine engines, particularly means for varying gas flow through the discharge nozzle thereof.

2. The Prior Art

In a typical bypass gas turbine engine, a core duct having a compressor, combustion section, high-pressure turbine, low-pressure turbine, a plurality of outlet guide vanes and a discharge nozzle is surrounded by an annular bypass duct which communicates with the core duct by movable valves, e.g., aft or downstream of the outlet guide vane and before or upstream of the discharge nozzle to mix (fan) bypass air with core gas and by controlling the opening and closing of such bypass vanes, to vary the bypass ratio of such engine.

Thus when maximum power is desired, e.g., for an ascending aircraft, the duct vanes are virtually closed, to reduce the flow of by-pass air into the core and therethrough known as minimum bypass ratio. During cruise or part-power conditions, such duct vanes would be increasingly opened to increase the flow of by-pass air into the core, reducing engine power and thus have the engine operate at high bypass ratio.

However such bypass vanes have proved cumbersome in operation and have added weight and complexity to the engine.

A further disadvantage of prior art variable bypass ratio gas turbine engines is that they have failed to meet desired performance goals in all modes of operation because they have performed with insufficient flow variability to maintain satisfactory engine performance in both supersonic and subsonic flight.

Attempts have been made to improve the flow variability in the above bypass gas turbine engines, see for example U.S. Pat. No. 4,050,242 to Dusa (1977) and U.S. Pat. No. 4,069,661 to Rundell et al (1978). These references teach the axially shifting of humpbacked surfaces in the bypass annulus of the gas turbine engine to constrict the annular bypass area in such engine to vary the bypass ratio per FIG. 3 of the above 1978 reference and FIGS. 2 and 3 of the above 1977 reference. Alternatively, a series of louvers connecting bypass duct to core duct positioned downstream of the low pressure turbine of such engine are opened and closed to vary the ratio of bypass air injected into the core gas duct per FIGS. 1 and 2 of the above 1978 reference.

The above references, while directed to apparatus which can enlarge or constrict flow area between bypass duct and core duct have added components of complexity to such engines with attendant breakdown and maintenance problems and would add considerable weight to such engine.

The above references also do not address correcting the swirl of exit gases from the low-pressure turbine to flow axially toward the discharge nozzle.

There is, accordingly, a need and market for an engine component which can overcome the above prior art shortcomings in a) swirl correction and/or b) in variable area bypass injection.

There has now been discovered an apparatus for counteracting and/or redirecting turbine exit gas swirl. There has further been discovered an apparatus for varying the area of bypass gas injection from bypass duct to core duct in a gas turbine engine that is of reduced complexity and lighter in weight than available in the prior art.

SUMMARY OF THE INVENTION

Broadly, the present invention provides in a gas turbine engine, having an inlet for air flow to a core duct and an outer bypass duct, the improvement comprising a Plurality of pivotable outlet guide vanes mounted in the after-turbine section of the engine in the path of core gas flow, proximate to and upstream of, the outlet nozzle thereof. The vanes are hollow and upstanding edgewise in such path with each vane being mounted to pivot on an axis extending through the length thereof. Means are provided to pivot the vanes on their axes so as to direct or control the flow of gas through such nozzle.

The invention further provides another embodiment in which in the above engine, a plurality of the above vanes extend from the core duct to proximate a wall defining the inner surface of the above bypass duct, the wall having a plurality of apertures therethrough between such bypass duct and such core duct to define an interduct connecting area, which apertures can be at least partially blocked by at least some of the vanes when the latter are pivoted therebeneath and means are provided to pivot such vanes so as to block or unblock the apertures to provide a variable vane valve so as to vary the duct connecting area and thus the flow of air from the bypass duct into the core duct and thus to vary the bypass ratio of the engine.

BRIEF DESCRIPTION OF THE DRAWINGS

The invention will become more apparent from the following detailed specification and drawings in which.

DESCRIPTION OF THE PREFERRED EMBODIMENTS

Figure 1:
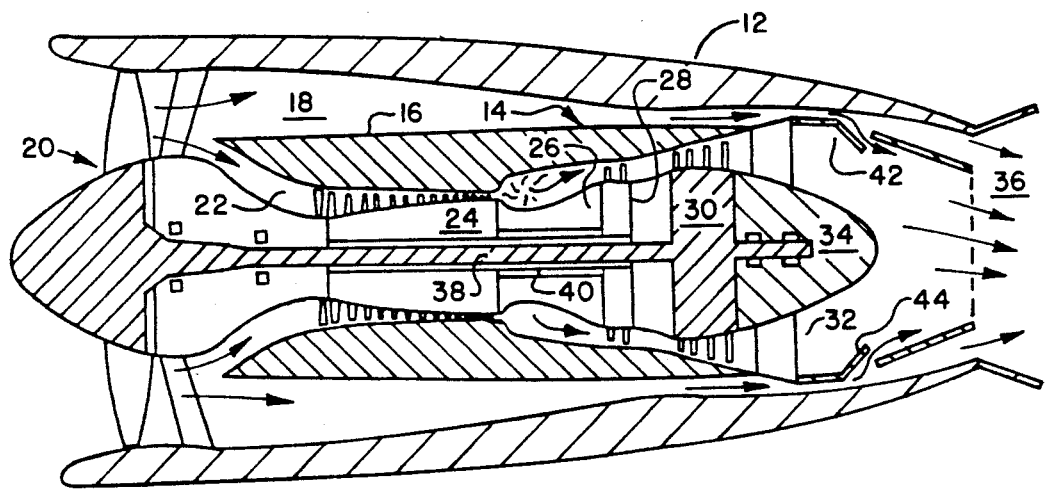
FIG. 1 is a sectional elevation view of a gas turbine engine of the prior art.

Referring in more detail to the drawings, prior art gas turbine engine 10 has an outer casing or nacelle 12 spaced apart from an inner core engine 14 by an inner annular wall member 16 so as to define an annular bypass duct 18 therebetween, as shown in FIG. 1. The mixed flow engine 10 includes a fan section 20, annular core duct 22, axial-flow compressor 24, annular combustor 26, high-pressure turbine 28, low-pressure turbine 30, outlet guide vane 32, mounted on center body 34 and thrust nozzle 36, as shown in FIG. 1. The high pressure turbine 28 connects to and drives the compressor 24 by rotor 40 as shown in FIG. 1. The low-pressure turbine 30 drives the fan 20 through a concentric shaft 38, extending forward inside the rotor 40 for the compressor 24 and the high-pressure turbine 28, as shown in FIG. 1. Flaps 42 and 44 open and close (by means not shown) to vary the annular area through which fan bypass air is injected or mixed into the main core stream, as shown or indicated in FIG. 1. Outlet guide vane 32 has a plurality of fixed upstanding vanes mounted in an annular array around the center body 44 and are so mounted on the center body to reduce the swirl of gases thrust rearwardly by the low-pressure turbine 30 as such core stream speeds toward the discharge nozzle 36, as shown or indicated in FIG. 1.

In operation, the fan 20 drives inlet air through the core duct 22 and the bypass duct 18, the core stream is compressed in compressor 24 and burned in combuster 26 and thrust rearwardly by high-speed compressor 28 and low-speed compressor 30, partly corrected by the outlet gas vanes 32, which core stream is then mixed with bypass air injected through flaps 42 and 44.

The drawback with the above prior art engine is that the outlet guide vanes 32 are set in an approximation of turbine gas swirl correction, which setting may be accurate for one flow rate of the core stream but not others, with the result that the core stream discharged through the thrust nozzle 36, has an uncorrected or partially corrected swirl to the detriment of the thrust of said engine. Further, the bypass flaps 42 and 44 and their activating mechanisms (not shown), add complexity and weight to the prior art engine.

Figure 2:
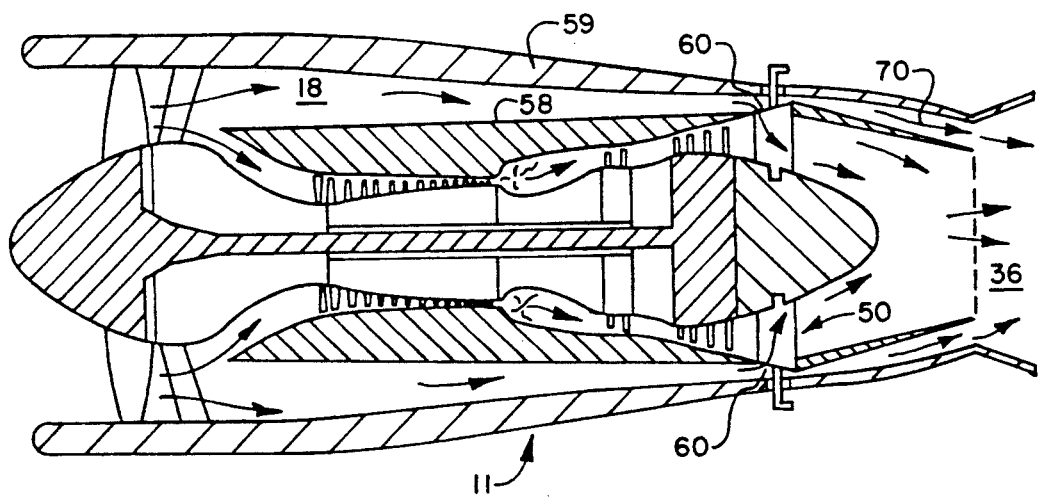
FIG. 2 is a sectional elevation view of a gas turbine engine embodying the present invention.
Figure 3:
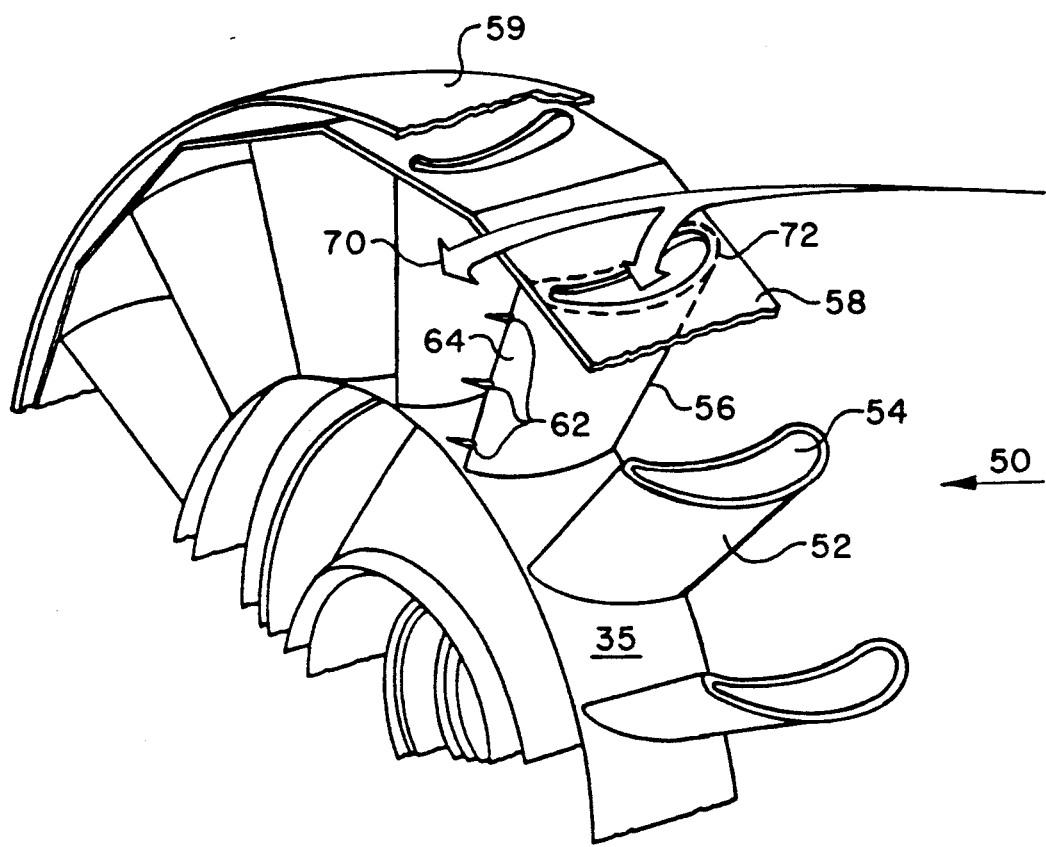
FIG. 3 is an enlarged fragmentary perspective view, partly in schematic, of components of a gas turbine engine embodying the present invention.
Figure 4:
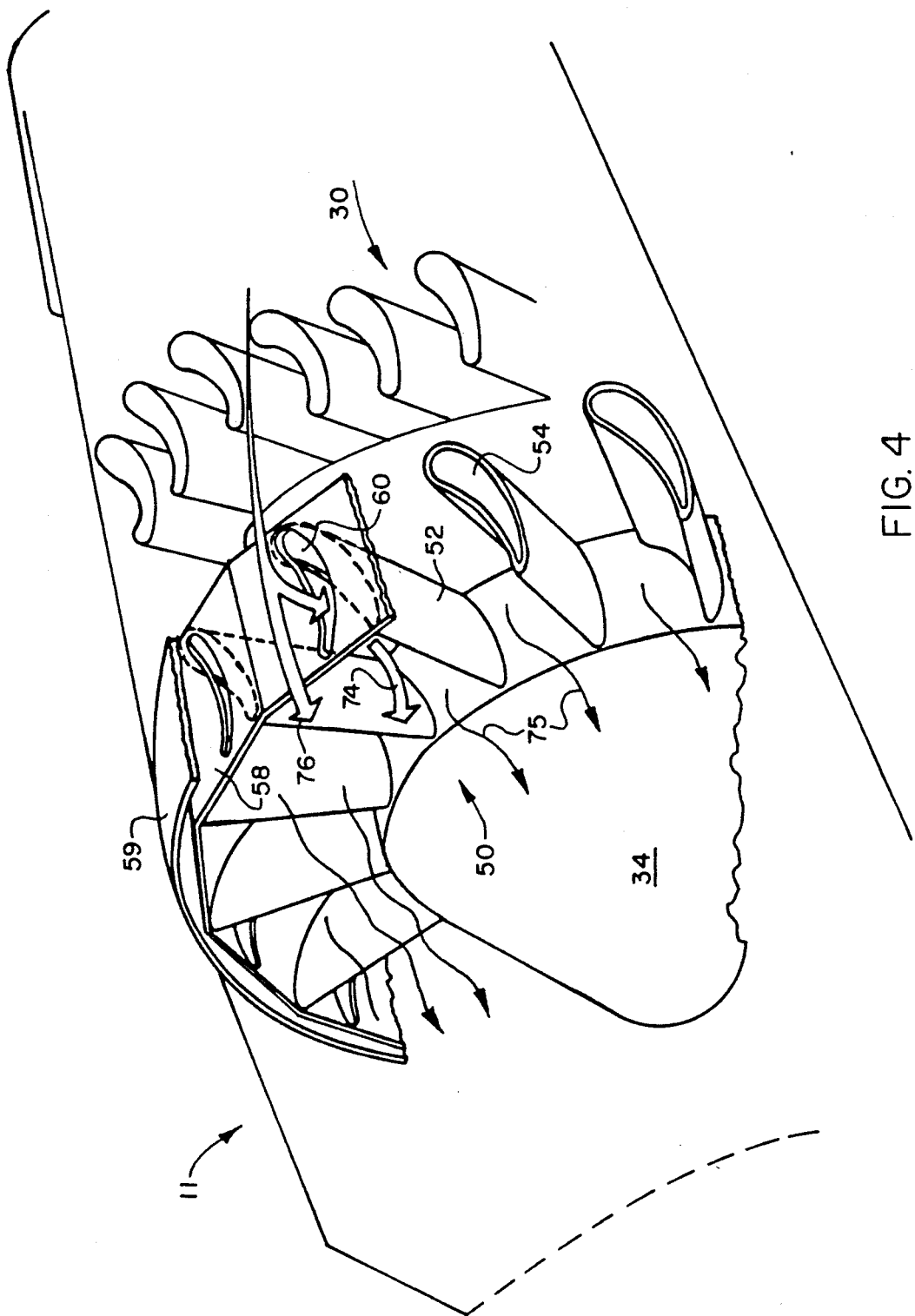
FIG. 4 is an enlarged fragmentary perspective view, partly in schematic, of a gas turbine engine embodying the present invention.

Such prior art engine can be improved by modifying it according to the present invention in which bypass flaps 42 and 44 (and their actuating mechanisms) are closed or eliminated and by replacing the outlet guide vane 32 with a variable vane valve 50 embodying the present invention, as shown or indicated in FIGS. 2, 3 and 4. The variable vane valve embodying the invention, herein the vane assembly, has upstanding hollow vanes 52 mounted on rear frame 35 proximate the center body 34, to pivot on axes 54 running through the length of each of said vanes near the upstream edge 56 thereof, as shown in FIG. 3

The vanes extend up to the inside wall 58 of the bypass duct 18, which wall 58 has apertures 60 therethrough positioned, sized and shaped to align with such hollow vanes 52 when such vanes are pivoted in registration thereunder, as shown in FIGS. 3 and 4. Each vane 52 further has discharge apertures 62 located at its trailing edge 64 thereof as shown in FIG. 3.

As indicated above, the vanes 52 are pivoted on their axes 54 (by means not shown, as vane controls or pivot mechanisms are known in the art). Thus the vanes 52 can be pivoted on their respective axes 54, either into registration with bypass duct apertures 60, as discussed above or out of registration with such ducts 60, to permit greater mixing of bypass gas with the core gas stream, as shown or indicated in FIG. 4.

The low-pressure turbine 30 is rotatably mounted upstream of the vane assembly 50 of the invention, as shown in FIGS. 2 and 4. The vane assembly 50 does not rotate, rather the vanes 52 pivot on static axes 54 into and out of registration with bypass duct apertures 60, as shown or indicated in FIGS. 3 and 4 and as described above.

In operation, the gas turbine engine 11 of the present invention operates as described above with respect to the engine of FIG. 1 except as follows: for high-power or thrust requirements, instead of closing bypass duct flaps 42 and 44 as would be done in the case of gas turbine engine 10, shown in FIG. 1, vanes 52 are pivoted into registration with bypass duct apertures 60 such that the greater portion of the fan air bypasses the valve assembly 50 thus avoiding injection into the core stream and flows directly to the thrust nozzle 36 of FIG. 2, as indicated by arrow 70 of FIGS. 2 and 3. However, a small portion of the bypass gas does flow into the hollow vanes 52, as indicated by the arrow 72 of FIG. 3, which vane input air escapes as three small streams through bleed apertures 62 in the vane trailing edge 64, as shown in FIG. 3, which serves to cool such vanes. Such vane positioning serves as a high-power, low-bypass setting of the vane assembly of the invention, suitable, e.g., for climbing aircraft For lower power requirements and greater fuel economy, e.g , for cruising aircraft, the vanes 52 of the invention are pivoted on their axes 54 out of registration with the bypass apertures 60, which draws or injects considerably greater bypass air from the bypass duct into the core stream of the engine as shown by arrow 74, while a lesser amount of fan-powered air bypasses the apertures 60 per arrow 76, as shown in FIG. 4. The core gas stream is shown as arrow 75, in FIG. 4. Thus as shown, vanes 52, so pivoted, draw or inject considerable amounts of bypass air into the core stream in a high bypass ratio setting, as shown or indicated in FIG. 4.

Further, there is a swirl problem to be reckoned with of core gases thrust aft by the rotating blades of the low-pressure turbine. That is, at a high-power setting, such as described above, the swirl angle of the turbine discharged gases is "x" degrees and in the prior art, fixed guide vanes have been designed with a specific cross-sectional shape in an attempt to minimize the core stream swirl and to straighten the flow of gases discharged through the engine nozzle. Likewise, in accordance with the power setting, the fixed outlet guide vane orientation is designed to minimize core stream pressure drop or loss across the vane, which pressure loss is a detriment to engine cycle fuel efficiency and thrust. Now in a high-bypass setting (low-power), e.g., as described above, the swirl angle of the turbine discharged core stream can be as high as 50 degrees more than that of the above high-power setting, ie. x+50 degrees. In this condition, the fixed outlet guide vane will suffer appreciable more pressure drop loss, having no means to orient itself for more efficient engagement with the core stream gas.

Accordingly, unlike the fixed outlet guide vanes of the prior art, the pivotable vanes 52 of the present invention, can pivot sufficiently to compensate for the increased swirl angle of the core gases at the high bypass setting so as to reduce pressure loss, minimize swirl and straighten the flow of gases thrust from the nozzle of engine 11, as shown or indicated in FIGS. 2 and 4.

It happens that from, e.g., maximum-power to minimum-power settings, the bypass ratio moves linearly in a complementary direction with that of the swirl angle so that as one pivot the vanes 52 of the invention, relative to the bypass apertures 60, the vanes so pivoted, are automatically compensating for the changing swirl angle of the turbine-driven core stream gases, providing another novel and synergistic feature of the variable vane valves embodying the present invention.

Thus the invention provides for weight saving in utilizing outlet guide vanes that are already present in many turbine engines (though not pivoting) and cutting bypass duct apertures over such pivotal vanes results in a further weight saving. Further, as noted above, the pivoting vanes of the invention vary the engine bypass ratio and automatically provide swirl correction for each bypass ratio setting at the same time, without the need for added controls, e g., to coordinate separate bypass duct flaps (as in the prior art) with pivoting of outlet guide vanes.

However, it is noted that the latter combination is also within the scope of the present invention. That is, this invention includes the pivoting of guide vanes with separate bypass duct flaps, such as flaps 42 and 44, shown in FIG. 1.

However, the synergistic combination of pivotable guide vanes, which close and open bypass ducts per FIGS. 3 and 4 and simultaneously and automatically provide swirl correction, is a preferred embodiment of the invention.

The following is a particularly preferred pivotable vane of the invention. Pivotable vane 52 pivots on an axial member 53, which member is unitary with an actuator arm 80, as shown or indicated in FIGS. 5 and 6. The pivot vane mounts between rear frame 35 (on bearings 82 and 84) and outside engine wall or case 59 (on bearings 86), with the vane blade 55 extending between such rear frame 35 and the bypass duct inside wall 58, as shown or indicated in FIGS. 5, 6 and 4. In such vane 52, is passage 90, having bleed apertures 92 therefrom, while rear passage 94, has trailing edge apertures 62 therefrom, as shown in FIGS. 4 and 5.

The above close clearance means that there will be a small amount of leakage when a vane 52 is pivoted into registration with its bypass slot 60, from bypass duct to core duct, which flow is relatively small and will add to the bypass air flowing into each hollow vane 52 (via passages 90 and 94) and out the respective bleed apertures 62 and 92 thereof, to mix with the core gas with little effect upon the bypass ratio.

Figure 6:
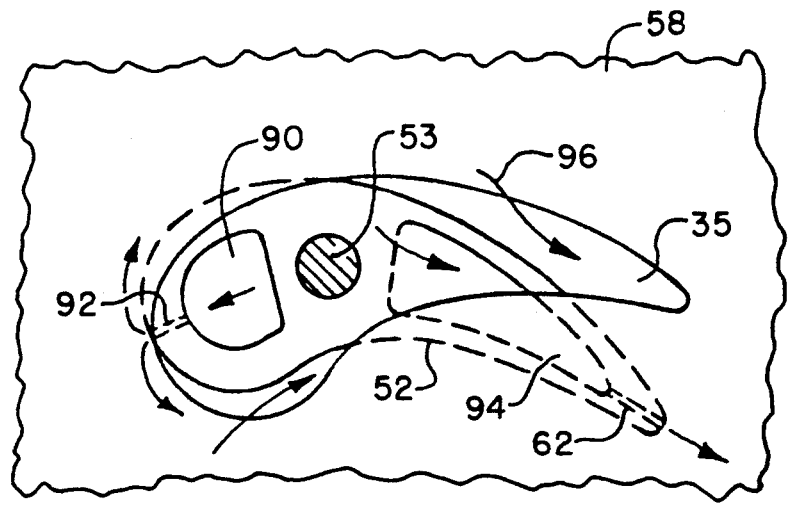
FIG. 5 is a fragmentary perspective view of a component of the pivotable vane valve embodying the present invention and FIG. 6 is a plan view partly in section, of the component of the invention shown in FIG. 5, taken on line 6—6, looking in the direction of the arrows.
Figure 5:
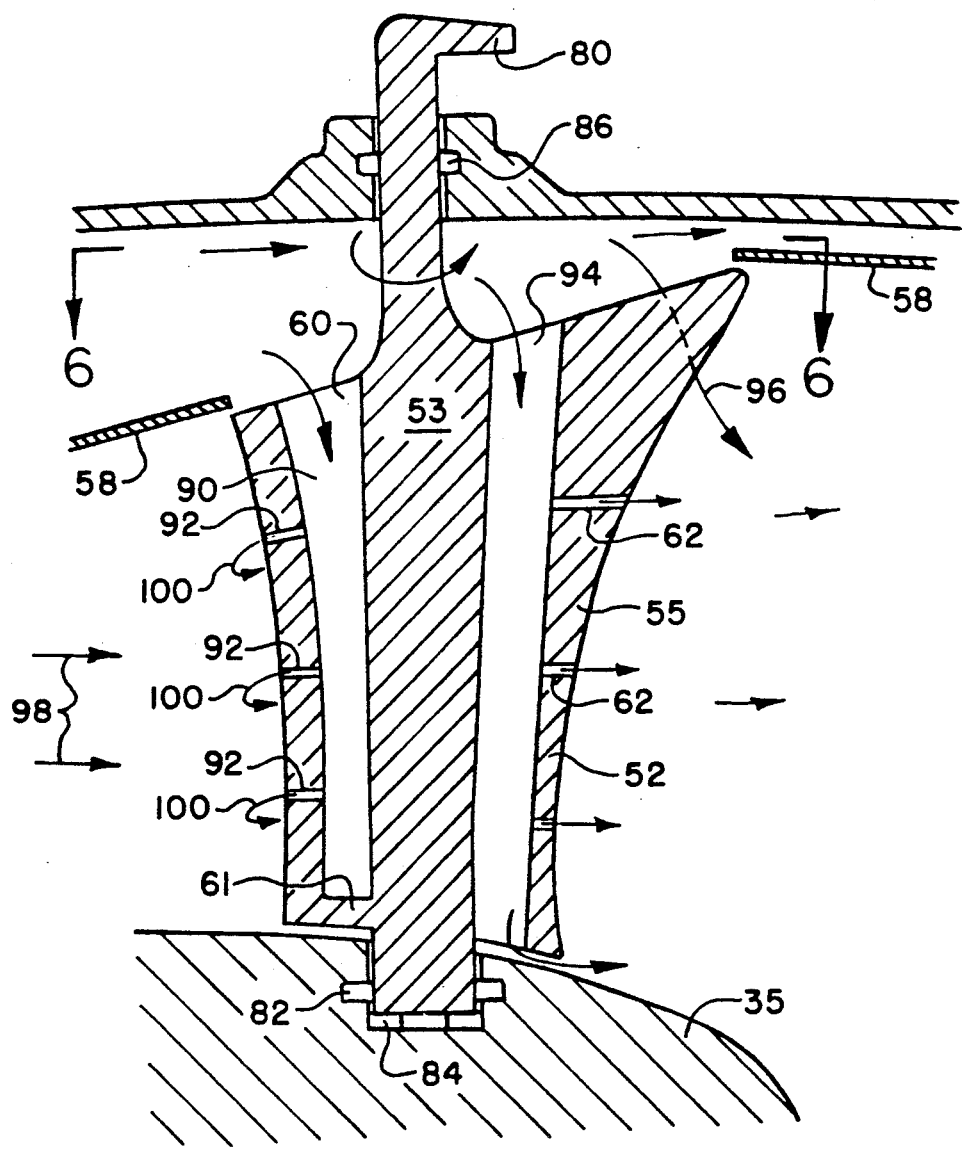

In operation, bypass air flows through the bypass duct 60 at least partially around the vane 52, per arrow 96, shown in FIGS. 5 and 6 and also into the passages 90 and 94 and out the respective apertures thereof 92 and 62 respectively, as shown or indicated in FIGS. 5 and 6. Note that the bypass air flowing down the passage 90 and out bleed apertures 92 meets the oncoming engine core gases indicated by arrows 98, which bypass cooling air, upon exiting through bleed apertures 92, quickly turns and doubles back around the blade 55 of the vane 52, forming a cooling flow therearound. Thus per the invention, bypass air is injected into the core gas flow and also into and through the vanes to cool same.

Per FIG. 5, the pivotable vanes of the invention preferably have a pair of lengthwise passages therethrough with bleed apertures added to each passage for further vane cooling. However, such bleed apertures can be omitted for ease of maintenance if desired, within the scope of the invention.

Also, one or both passages can be capped at the inner vane end (e.g. at cap 61, shown in FIG. 5) to define closed-end cavities with gas flow therein exiting said bleed apertures.

Further, the rear frame 35 on which the vanes pivot, can have an undulating surface to provide close clearance with the vane inner ends when the vanes are pivoted into alignment with the bypass apertures and to provide greater clearance thereunder (for ease of passage air flow) when said vanes pivot away from such alignment.

The vanes of the invention can have various cross-sectional shapes as can the associated bypass slot or aperture for each vane and such apertures can be larger or smaller than the cross-sectional shape of the associated vanes as desired within the scope of the invention. Preferably, however, the vanes have an air foil type of cross-sectional shape, e.g., as shown in FIGS. 3 and 4 and the associated bypass aperture of each such vane matches the cross-sectional size and shape thereof for good closure of said apertures and maximum use of the closing surface of each vane so as to minimize the number of pivotable vanes required for weight-saving purposes.

Accordingly, the number of pivotable vanes and matching bypass apertures employed can be virtually any number within the scope of the invention but preferably will be the minimum number required to provide sufficient bypass ratio control and swirl correction to the core gas stream, particularly when the engine operates at high bypass ratios.

The pivotable vanes of the invention can pivot on an axis located anywhere within the vane including proximate the center thereof as discussed above, within the scope of the invention.

Thus, as indicated above, at high power, minimum bypass ratio conditions, the vanes of the invention are relatively aligned with the core gas flow from the low-pressure turbine and relatively little swirl correction is required though such requirement is met by vane cross-sectional shape design and positioning on the rear frame Proximate the center body, with the bypass apertures cut to a contour that matches the cross-sectional shape of the vane. At this setting, as noted above, the vanes are pivoted into registration under their matching bypass duct apertures such that the flow area provided by such apertures is minimized, reducing the flow of fan bypass air into the core, thus providing minimum bypass ratio. However, during cruise or part-power conditions, the vanes are pivoted such that the increased flow area of the duct apertures results in higher bypass air injections into the core stream and thus higher engine bypass ratios. In such conditions, greater swirl correction of the core stream is needed and provided by the so-pivoted vanes of the invention.

Thus the invention provides a) variable exposure of injection/mixing area between the fan bypass duct and the core duct as a result of pivoting the outlet guide vanes of the invention which b) automatically adds increasing swirl correction as the bypass ratio and the swirl angle of the core gas increase.

That is, there is a straight-line correlation between bypass ratio increase and swirl angle increase as the engine is throttled back to low power and reduced RPM, which swirl angle is readily corrected by the pivoting blades of the invention.

What is claimed is:

1. In a gas turbine engine having an inlet for air flow to an annular core duct and an outer annular duct for bypassing a portion of the inlet air flow around said core duct, the improvement comprising, a plurality of pivotable outlet guide vanes mounted in the rear of said engine on a core support body proximate to an upstream of the outlet nozzle thereof, each vane being mounted fully in the path of the core gas flow so as to divide said flow therearound, said vanes being mounted to pivot on axes extending outwardly from said support body and transversely to the core gas flow and means to pivot said vanes on their axes so as to direct or apply adjustable swirl correction to the flow of said gas through said nozzle.

2. The engine of claim 1, having a plurality of by-pass duct flaps proximate to and upstream of the outlet nozzle thereof and means to open and close said flaps to vary the flow of bypass air from the bypass duct to the core duct, to vary the bypass ratio of said engine and means to pivot said vanes to reduce or correct the swirl of core gases passing therethrough.

3. The engine of claim 1, wherein a plurality of said vanes extend from said support body across said core duct to proximate a wall defining the inner surface of said by-pass duct, said wall having a plurality of apertures therethrough between said by-pass duct and said core duct to define an interduct connecting area, which apertures can be at least partially blocked by at least some of said vanes when the latter are pivoted into registration therewith and means to pivot said vanes so as to block or unblock said apertures so as to vary said interduct connecting area and thus the flow of air from said by-pass duct into said core duct so as to vary the by-pass ratio of said engine and also to apply swirl correction to the core gases.

4. The engine of claim 3, wherein said guide vanes are mounted aft of a low pressure turbine in said engine.

5. The engine of claim 3, wherein said vanes are radially mounted on a central support member to pivot on static axes.

6. The engine of claim 3, wherein said apertures are shaped to match the cross-sectional shape of said vanes.

7. The engine of claim 6, wherein said aperture is blunt and curved at its upstream end and tapers to a smaller edge at its downstream end.

8. The engine or claim 3, wherein each vane has at least one passage therein through the length thereof, so that when said vanes are pivoted into registration therein said bypass apertures to align with and cover same, they substantially block the flow of gas from said bypass duct into said core duct, although a portion of the bypass air flows through said channel for vane-cooling purposes.

9. The engine of claim 8, wherein said channel has at least one bleed aperture connecting to the trailing edge of said vane.

10. The engine of claim 8, wherein said channel has at least one bleed aperture connecting to said leading edge.

11. The engine of claim 8, wherein said vanes are pivoted relative to said bypass apertures to adjust said bypass ratio and to deflect gas flow swirl toward engine axial flow as said gas flows toward said nozzle.

12. The engine of claim 11, wherein said vanes are pivoted relative to said bypass duct apertures to more fully open same and increase said bypass ratio and concurrently increase swirl correction of the core gas flow toward the engine discharge nozzle.

13. The engine of claim 3, wherein each vane pivots on an axial pivot member proximate the vane axial center, said vane having forward and rearward channels extending lengthwise of said vane along and proximate the forward and rearward sides respectively of said axial pivot member, so that when said vanes are pivoted into registration with said bypass apertures, they substantially block the flow of gas from said bypass duct into said core duct, although a portion of the bypass air flows through said channels for vane cooling purposes and then into said core duct.

14. The engine of claim 13, wherein at least one channel has at least one bleed aperture connecting to an outside surface of said vane.

15. The engine of claim 14, wherein at least one channel is closed-ended proximate the inside end of said vane to define a chamber open at the outer end of said vane, which chamber has at least one bleed aperture connecting to an outside surface of said vane.

16. The engine of claim 13, wherein said forward channel has at least one bleed aperture connecting to said leading edge and said rearward channel has at least one bleed aperture connecting to the trailing edge of said vane, to permit bypass air to flow through said channels and said bleed apertures to cool said vane.

* * * * *